(12) United States Patent
Sharma et al.

(10) Patent No.: US 8,635,632 B2
(45) Date of Patent: Jan. 21, 2014

(54) HIGH PERFORMANCE AND RESOURCE EFFICIENT COMMUNICATIONS BETWEEN PARTITIONS IN A LOGICALLY PARTITIONED SYSTEM

(75) Inventors: Rakesh Sharma, Austin, TX (US); Satya P. Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/582,812

(22) Filed: Oct. 21, 2009

(65) Prior Publication Data

US 2011/0093870 A1 Apr. 21, 2011

(51) Int. Cl.
*G06F 3/00* (2006.01)
(52) U.S. Cl.
USPC .......................................................... 719/328
(58) Field of Classification Search
None
See application file for complete search history.

(56) References Cited

U.S. PATENT DOCUMENTS

| | | | |
|---|---|---|---|
| 5,682,534 A * | 10/1997 | Kapoor et al. ................ | 719/328 |
| 6,654,812 B2 | 11/2003 | Gioquindo et al. | |
| 7,051,108 B1 * | 5/2006 | Jones et al. ................... | 709/230 |
| 7,539,987 B1 | 5/2009 | Dey et al. | |
| 2006/0034167 A1 | 2/2006 | Grice et al. | |
| 2006/0070066 A1 * | 3/2006 | Grobman ......................... | 718/1 |
| 2007/0050763 A1 | 3/2007 | Kagan et al. | |
| 2007/0067775 A1 | 3/2007 | Shultz et al. | |
| 2008/0059644 A1 * | 3/2008 | Bakke et al. ................... | 709/230 |
| 2008/0092148 A1 | 4/2008 | Moertl | |
| 2008/0109818 A1 * | 5/2008 | Fried et al. ..................... | 719/313 |
| 2008/0168208 A1 * | 7/2008 | Gregg ............................ | 710/306 |
| 2009/0055601 A1 | 2/2009 | McKenney et al. | |
| 2009/0094258 A1 | 4/2009 | Chen et al. | |
| 2009/0164660 A1 | 6/2009 | Abrams | |
| 2009/0183166 A1 | 7/2009 | Dillenberger et al. | |
| 2010/0005464 A1 * | 1/2010 | Malyugin et al. ............... | 718/1 |

OTHER PUBLICATIONS

Shimosawa, et al., "Logical Partitioning without Architecture Supports", IEEE International, Jul. 28, 2008-Aug. 1, 2008, pp. 355-364.
International Search Report and Written Opinion dated Nov. 12, 2010 for International Application No. PCT/EP2010/062559, 10 pages.

* cited by examiner

*Primary Examiner* — Emerson Puente
*Assistant Examiner* — Sisley Kim
(74) *Attorney, Agent, or Firm* — Francis Lammes; Stephen J. Walder, Jr.; Libby Z. Toub

(57) ABSTRACT

A mechanism is provided for communicating between a plurality of applications. An application programming interface (API) associated with an originating application running on a first logical partition in a plurality of logical partitions of a logically partitioned data processing system receives a request to send data to a destination application. The API sends a request to identify a location of the destination application to a virtualization management mechanism. Responsive to receiving a response from the virtualization management mechanism, the API determines whether the location of the destination application is in a second logical partition in the plurality of logical partitions of the logically partitioned data processing system. Responsive to the location being in the second logical partition, the API uses a bypass protocol to send the request from the originating application to the destination application.

14 Claims, 5 Drawing Sheets

HIGH PERFORMANCE AND RESOURCE EFFICIENT COMMUNICATIONS BETWEEN PARTITIONS IN A LOGICALLY PARTITIONED SYSTEM

BACKGROUND

The present application relates generally to an improved data processing apparatus and method and more specifically to an apparatus and method for a high performance and resource efficient communications between partitions in a logically partitioned system.

In today's information technology infrastructure, many server systems support logical partitioning. Many logical partitions of a logically partitioned system execute operating systems on which applications are deployed. Such applications communicate with applications within the same partition, within the same logically partitioned system, with devices coupled to the logically partitioned system, and with other applications on other systems coupled to the logically partitioned system. The communication protocols required to support such communication must support connection oriented, in-order, reliable, and flow-controlled data delivery. Implementing protocols to meet these requirements leads to resource intensive implementation which requires increased performance. Delivering such performance requires sophisticated and expensive communication hardware. The requirements still remain in place even in virtualized server environments.

SUMMARY

In one illustrative embodiment, a method, in a data processing system, is provided for communicating between a plurality of applications. The illustrative embodiment receives a request from an originating application to send data to a destination application. The illustrative embodiment sends a request to identify a location of the destination application to a virtualization management mechanism. The illustrative embodiment determines whether the location of the destination application is a second logical partition in the plurality of logical partitions of the logically partitioned data processing system in response to receiving a response from the virtualization management mechanism. The illustrative embodiment uses a bypass protocol to send the request from the originating application to the destination application in response to the location being the second logical partition.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for a high performance and resource efficient communication among a plurality of applications running on logical partitions of a logically partitioned system. The performance of the communication is increased by providing a high throughput with a low latency. By increasing the throughput and decreasing latency, the logically partitioned system reduces the processing requirements of the logically partitioned system's components such as processing units, memory, input/output bandwidth, or the like. The mechanism comprises a bypass transport protocol for communicating between logical partitions. Communication software within each operation system executing on the logical partition determines when the bypass transport protocol is to be deployed. Therefore, application programming interfaces are maintained thus supporting existing applications without change and supporting connection oriented, reliable, in-order, and flow-controlled data transfers.

Figure 1:
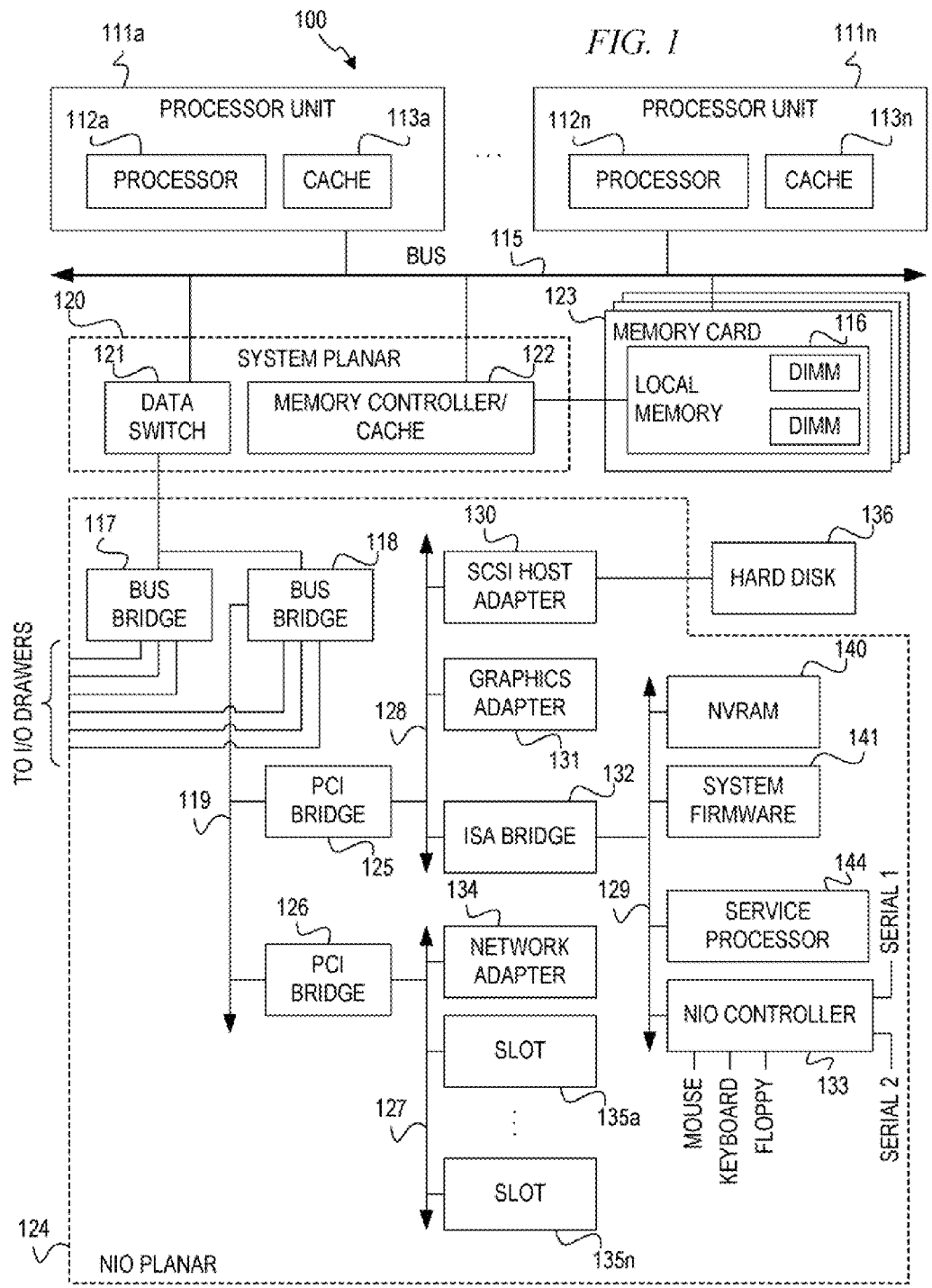
FIG. 1 depicts a block diagram of a data processing system with which aspects of the illustrative embodiments may advantageously be utilized.
Figure 2:
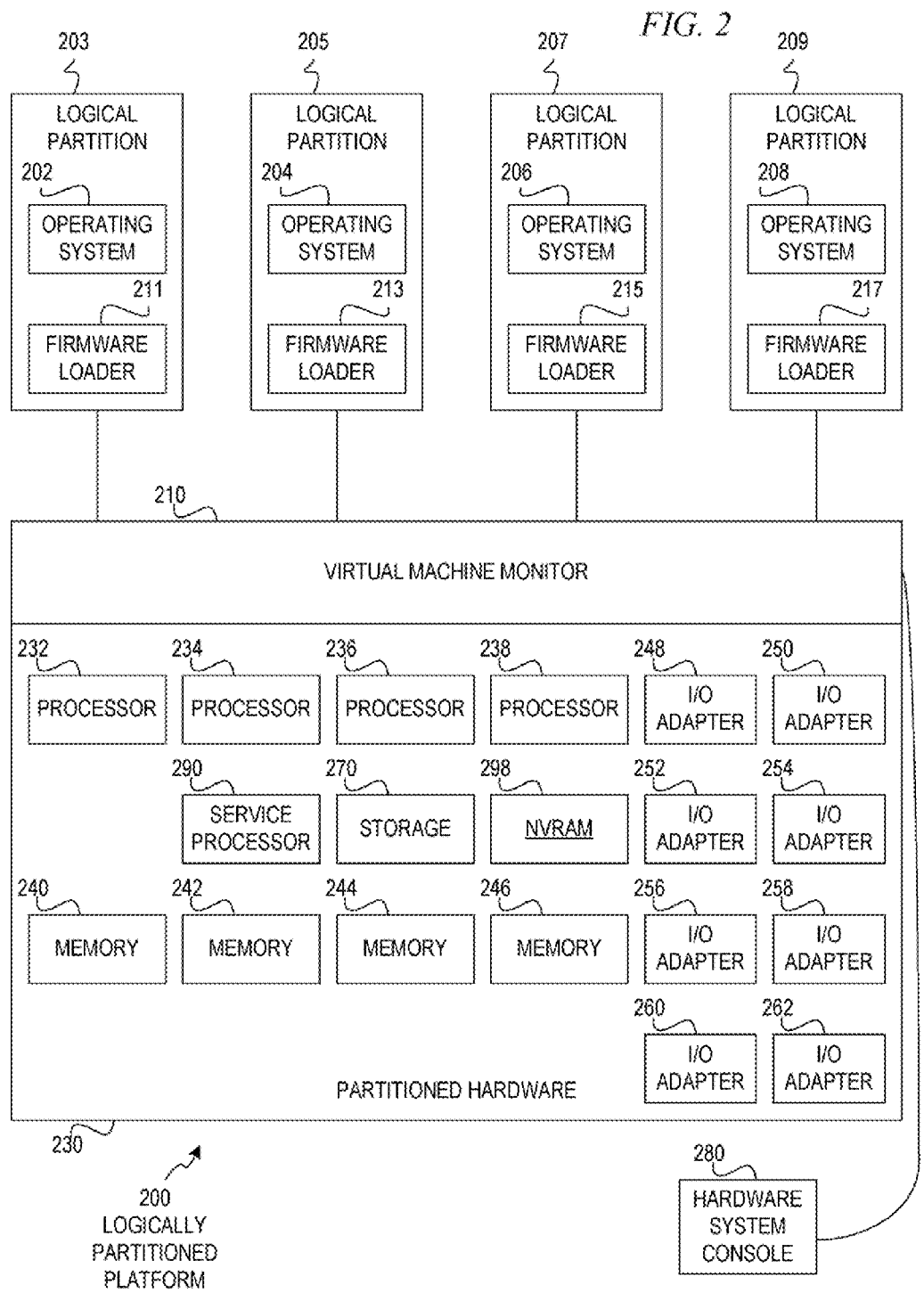
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a high performance and resource efficient communication mechanism, this is only an example and is not intended to state or imply any limitation with regard to the features of the present invention. To the contrary, the illustrative embodiments are intended to include distributed data processing environments and embodiments in which a high performance and resource efficient communication mechanism may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111a-111n. Each of processor units 111a-111n includes a processor and a cache memory. For example, processor unit 111a contains processor 112a and cache memory 113a, and processor unit 111n contains processor 112n and cache memory 113n.

Processor units 111a-111n are connected to main bus 115. Main bus 115 supports system planar 120 that contains processor units 111a-111n and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135a-135n via PCI bus 127.

Industry standard architecture (ISA) bus 129 connects to PCI bus 128 via ISA bridge 132. ISA bridge 132 provides interconnection capabilities through MO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

Figure 3:
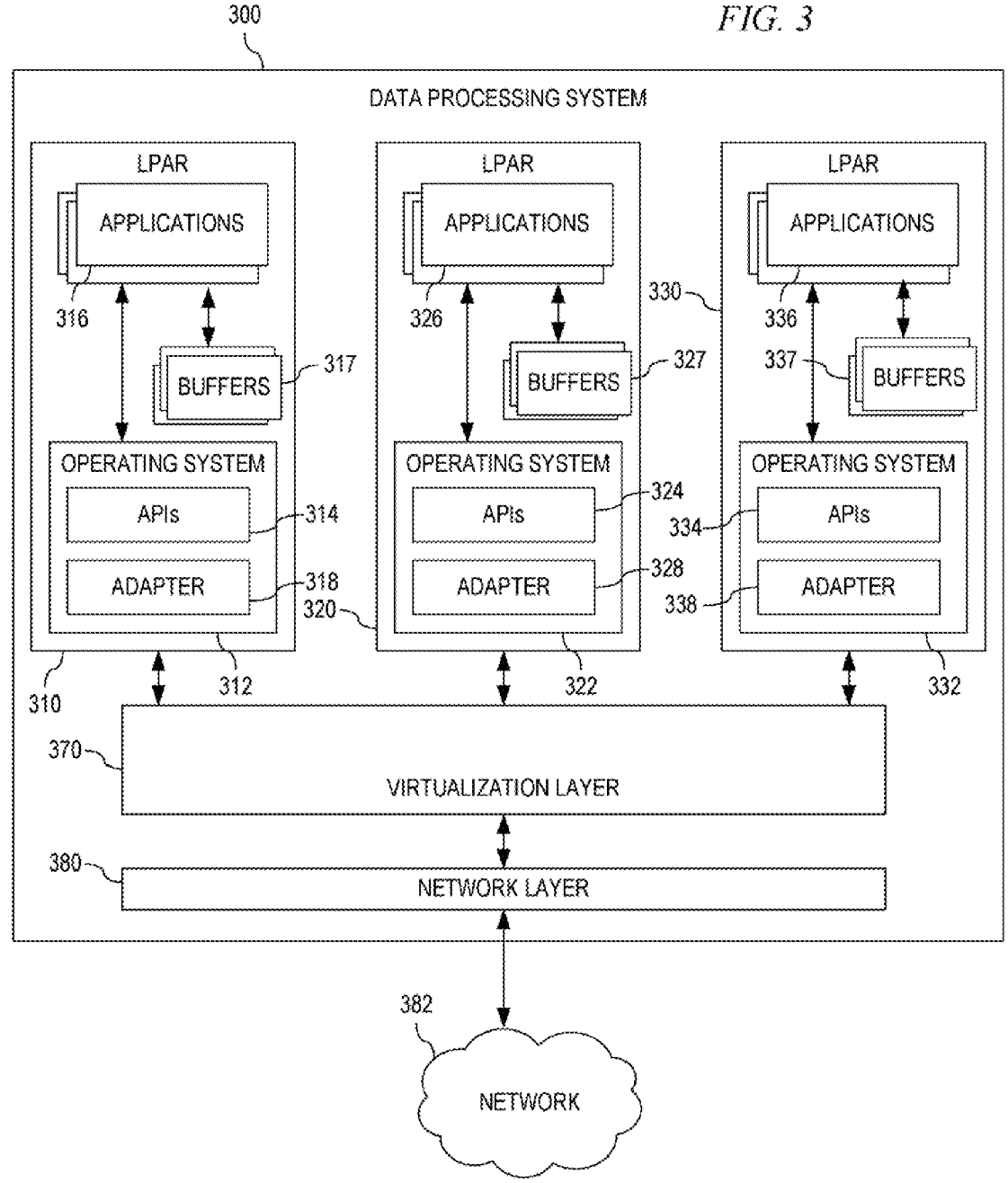
FIG. 3 depicts an exemplary block diagram illustrating a data processing system with a virtualized environment in accordance with an illustrative embodiment.

FIG. 3 depicts an exemplary block diagram illustrating a data processing system with a virtualized environment in accordance with an illustrative embodiment. Logically partitioned data processing system 300 has a plurality of logical partitions (LPARs) 310, 320, 330, which may also be referred to as clients or initiators. LPAR 310 has an instance of an operating system 312 with a set of application programming interfaces (APIs) 314 and one or more applications 316 running. LPAR 320 has operating system 322 with APIs 324 and one or more applications 326. LPAR 330 has operating system 332 with APIs 334 and one or more applications 336. While logically partitioned data processing system 300 illustrates only LPARs 310, 320, and 330, the illustrative embodiments are not limited to such. Rather, any number of LPARs may be utilized with the mechanisms of the illustrative embodiments without departing from the spirit and scope of the present invention.

LPARs 310, 320, and 330 may communicate with one another through virtualization layer 370. Virtualization layer 370 is software that performs communications and resource management to allow multiple instances of operating systems 312, 322, and 332 to run on logically partitioned data processing system 300 at the same time. Virtualization layer 370 performs tasks such as processor time slice sharing, memory allocation, or the like. Virtualization layer 370 may be, for example, a hypervisor.

Applications 316, 326, and 336 may include network applications that communicate with other network applications via network 382 or local data processing system applications that communicate with other applications in the same data processing system. For example, one of applications 316 communicating with one of applications 336. Applications 316, 326, and 336 may also have an associated set of application buffers 317, 327, and 337, respectively. When communicating to a network application through network 382, applications 316, 326, and 336 make transport protocol calls using a connection oriented, reliable, in-order delivery, flow-controlled protocol, such as TCP, which is part of TCP/IP protocol suite, to APIs 314, 324, and 334, and operating systems 312, 322, and 332 that communicate through adapters 318, 328, and 338, respectively, to virtualization layer 370 and network layer 380 to network 382. Network layer 380 is software that performs tasks for network communication. Network layer 380 may perform tasks such as end-to-end packet delivery, quality of service maintenance, error control, and the like.

By applications 316, 326, and 336 accessing transport protocol using APIs 314, 324, and 334, applications 316, 326, and 336 are allowed to open connections to remote applications, queue data to be delivered, receive data, close connections on conclusion of data transfer, or the like. Thus, the transport protocol is resource intensive as the transport protocol needs a transport protocol layer, a network protocol layer, a link layer, and a communication adapter driver processing, which may be necessary for network communication but not for local communications.

The illustrative embodiments provide for high performance communications between applications 316, 326, and 336 running in LPARs 310, 320, and 330 of a virtualized server platform, such as logically partitioned data processing system 300. In addition to providing high performance (very high bandwidth and lower latency transport), the communications provided by the illustrative embodiments reduce resource requirements, such as central processing unit (CPU) usage, memory usage, input/output (I/O) bandwidth, or the like, for the communications. In order to provide high bandwidth communications, the illustrative embodiments provides a less resource intensive protocol, referred to herewith as a bypass transport protocol. The bypass transport protocol comprises many of the same attributes as the transport protocol used for network communications but leverages the fact that the communication is between applications 316, 326, and 336 running on logically partitioned data processing system 300 in LPARs 310, 320, and 330. Therefore, the transport protocol elements of discovering remote host application end points are preserved. A remote application end-point is characterized by a set of addressing elements which include hardware addresses of communication adapters. That is, the hardware address of communication adapters 318, 328, and 338, associated with the end-points of applications 316, 326, and 336 may be determined to be for one of LPARs 310, 320, and 330 within logically partitioned data processing system 300.

For example, when one of applications 316 makes a data send call to API 314, API 314 performs a check via adapter 318 with virtualization layer 370 to determine whether the application to be communicated with is within one of the LPARs of logically partitioned data processing system 300, such as LPAR 320 or 330. Since virtualization layer 370 provides LPAR-to-LPAR communications, virtualization layer 370 comprises knowledge of all the hardware addresses of network end-points, which may be comprised in a list of hardware addresses of network end-points. Therefore, virtualization layer 370 may determine whether a destination is internal or external to logically partitioned data processing system 300. If virtualization layer 370 responds that the application to be communicated with is, for example, one of applications 336 in LPAR 320, then API 314 identifies application 336 to be a local application, stores the identification, and uses the bypass transport protocol for application 316 to application 336 communications. API 314 only performs the identification once for the duration of communications between application 316 and application 336 therefore providing an added reduction in resource requirements. The bypass transport protocol uses data processing system hardware, such as the processor data move capability, as opposed to using full transport protocol, thus, delivering high bandwidth and low latency.

Once API 314 identifies the type of protocol to be used based on the identification received from virtualization layer 370, API 314 then transfers data from application buffers 317 associated with application 316 to remote application buffers 337 associated with application 336 if application 336 is ready to receive the data. If application 336 is not ready to receive data, then API 314 may send the data to a system buffer (not shown) associated with operating system 332. Thus, API 314 performs only those processes necessary to transport the packet internally from LPAR 310 to LPAR 330 thereby eliminating the resource intensive processes required with a transport protocol, such as transport protocol layer, a network protocol layer, a link layer, and a communication adapter driver processing, which may be necessary for network communication but not for local communications.

Therefore, using a bypass protocol maintains application data order and requires no additional processing for data integrity because a determination has already been made that the data is destined for a destination within logically partitioned data processing system 300. The bypass transport protocol supports flow-control via flow application capabilities of API 314, 324, and 334 and full compatibility of application API is maintained. For example, socket API has socket buffer capability that allows application data to be flow-controlled and socket based applications need not change to including the address family. That is, no changes or modifications to applications 316, 326, and 336 are required and applications 316, 326, and 336 close connections normally. Additionally, the socket information of APIs 314, 324, and 334 is preserved. Overall resource efficiency is achieved by using the bypass protocol, which is designed to minimize machine resource usage. Examples of the resource efficiencies provided by the bypass protocol may be larger layer packet size, no need for retry timers and algorithms, integrity checks, or the like, which are requirements for external communication protocols, such as TCP.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
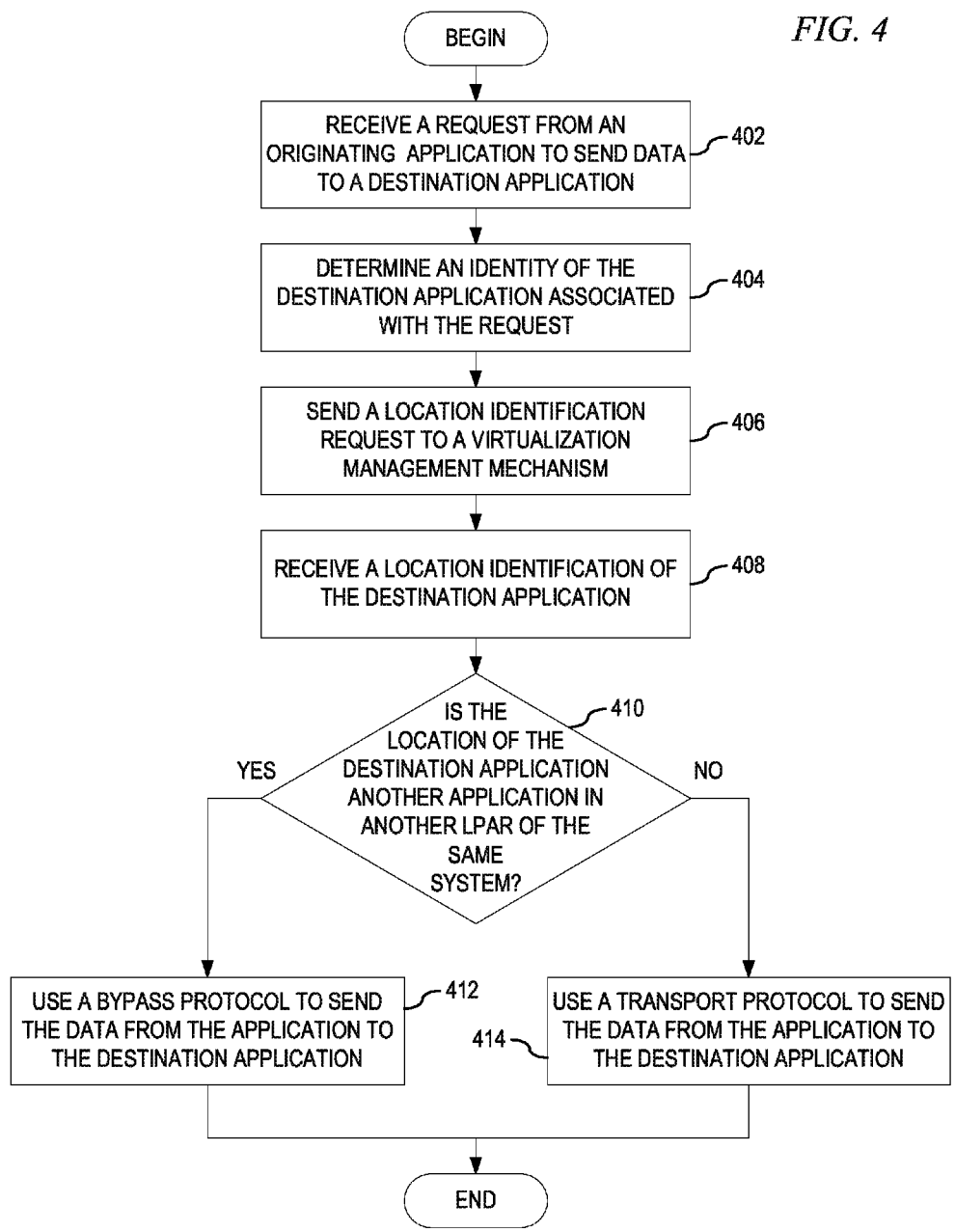
FIG. 4 depicts an operation performed by an application programming interface of a logical partition in accordance with an illustrative embodiment.
Figure 5:
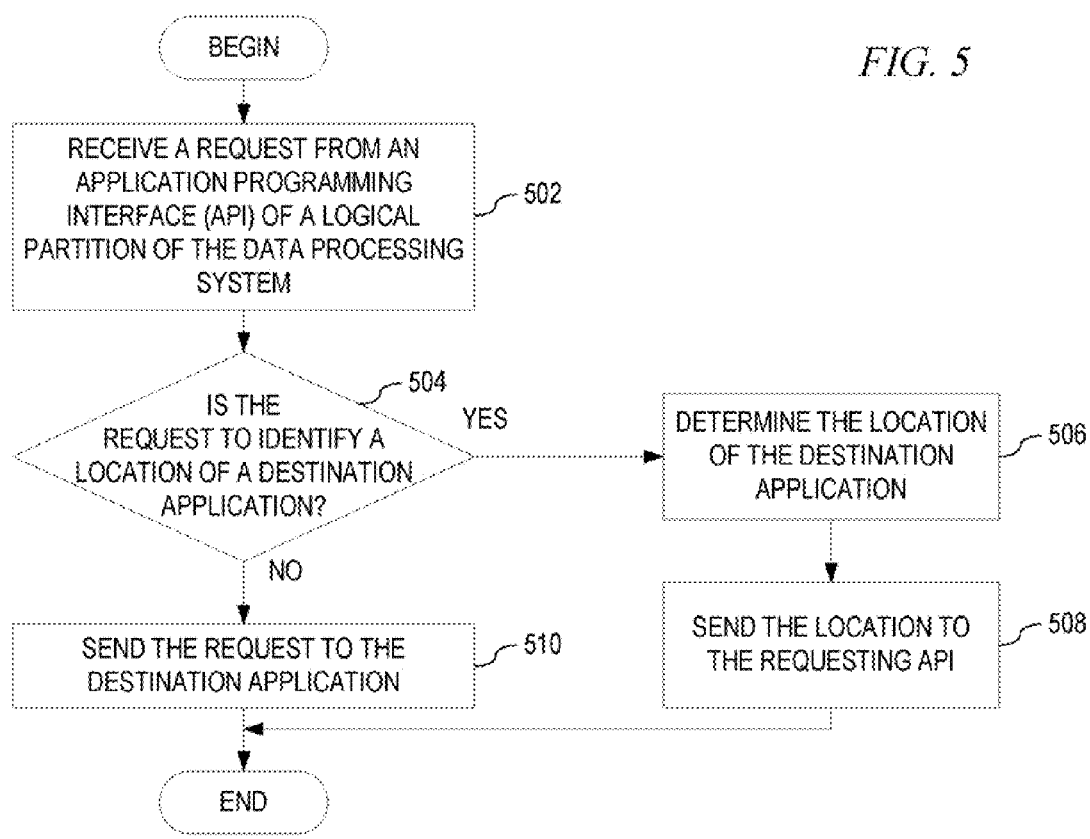
FIG. 5 depicts an operation performed by a virtualization mechanism of a logically partition system in accordance with an illustrative embodiment.

Referring now to FIGS. 4 and 5, these figures provide flowcharts outlining example operations of high performance and resource efficient communications between partitions in a logically partitioned system. FIG. 4 depicts an operation performed by an application programming interface of a logical partition in accordance with an illustrative embodiment. As the operation begins, the application programming interface (API) receives a request from an originating application to send data to a destination application (step 402). The API determines an identity of the destination application associated with the request (step 404) and sends a location identification request to a virtualization management mechanism associated with the virtualization layer in order to identify the location of the destination application (step 406). The API then receives a location identification of the destination application (step 408) and determines whether the location of the destination application is another application in another LPAR of the same data processing system (step 410). If at step 410 the destination application is another application in another LPAR of the same data processing system, then the API uses a bypass protocol to send the data from the originating application to the destination application in the second logical partition (step 412), with the operation terminating thereafter. If at step 410 the destination application fails to be another application in another LPAR of the same data processing system, then the API uses a transport protocol to send the data from the originating application to the destination application in the second logical partition (step 414), with the operation terminating thereafter.

FIG. 5 depicts an operation performed by a virtualization mechanism of a logically partitioned system in accordance with an illustrative embodiment. As the operation begins, the virtualization mechanism receives a request from an application programming interface (API) of a logical partition of the data processing system (step 502). The virtualization mechanism determines whether the request is a request to identify a location of a destination application (step 504). If at step 504 the request is to identify a location of a destination application, then the virtualization mechanism determines the location of the destination application (step 506) and sends the location to the requesting API (step 508), with the operation terminating thereafter. If at step 504 the request is to send a packet to another application, the virtualization mechanism sends the request to the destination application (step 510), with the operation terminating thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a high performance and resource efficient communications between partitions in a logically partitioned system. The bypass protocol transparently avoids transport protocol overhead for intra-system logical partition to logical partition communications. The bypass protocol supports flow control and in-order delivery of data, ensures the reliability and integrity of data through intra-system transfers, and efficient notification and handling of events. By increasing the throughput and decreasing latency, the logically partitioned system reduces the processing requirements of the logically partitioned system's components such as processing units, memory, input/output bandwidth, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically partitioned data processing system, for communicating between a plurality of applications, the method comprising:

receiving, by an application programming interface associated with an originating application running on a first logical partition in a plurality of logical partitions of the logically partitioned data processing system, a request to send data to a destination application, wherein the data is sent to a corresponding application buffer among a set of application buffers in the plurality of logical partitions associated with the destination application;

sending, by the application programming interface, a request to identify a location of the destination application to a virtualization management mechanism, wherein the virtualization management mechanism is external to the plurality of logical partitions and wherein the virtualization management mechanism is in communication with each of the plurality of logical partitions in the logically partitioned data processing system;

responsive to receiving a response from the virtualization management mechanism, determining, by the application programming interface, whether the location of the destination application is in a second logical partition in the plurality of logical partitions of the logically partitioned data processing system;

responsive to the location being in the second logical partition, using, by the application programming interface, a bypass protocol to send the data from the originating application to the destination application in the second logical partition; and responsive to the destination application failing to be ready to receive the data, sending, by the application programming interface, the data to a system buffer associated with an operating system running the destination application.

2. The method of claim 1, further comprising:
responsive to the location failing to be in the second logical partition, using, by the application programming interface, a transport protocol to send the data from the originating application to the destination application.

3. The method of claim 1, further comprising:
receiving, by the virtualization management mechanism, the request to identify the location of the destination application;
identifying, by the virtualization management mechanism, the location of the destination application using a list of hardware addresses of network end-points connected to the logically partitioned data processing system; and
sending, by the virtualization management mechanism, the location of the destination application to the application programming interface.

4. The method of claim 1, wherein using the bypass protocol reduces resource requirements and wherein the resource requirements are at least one of central processing unit (CPU) usage, memory usage, or input/output (I/O) bandwidth.

5. The method of claim 1, wherein using the bypass protocol preserves transport protocol elements of discovering remote host application end-points.

6. The method of claim 1, wherein using the bypass protocol preserves the socket information of the application programming interface, thereby eliminating any need to modify the plurality of applications.

7. A computer program product comprising a non-transitory computer readable storage medium having a computer readable program stored therein, wherein the computer readable program, when executed on a computing device, causes the computing device to:
receive a request from an originating application to send data to a destination application, wherein the data is sent to a corresponding application buffer among a set of application buffers in the plurality of logical partitions associated with the destination application;
send a request to identify a location of the destination application to a virtualization management mechanism, wherein the virtualization management mechanism is external to the plurality of logical partitions and wherein the virtualization management mechanism is in communication with each of the plurality of logical partitions in the logically partitioned data processing system;
responsive to receiving a response from the virtualization management mechanism, determine whether the location of the destination application is in a second logical partition in a plurality of logical partitions of a logically partitioned data processing system;
responsive to the location being in the second logical partition, use a bypass protocol to send the data from the originating application to the destination application in the second logical partition; and
responsive to the destination application failing to be ready to receive the data, send the data to a system buffer associated with an operating system running the destination application.

8. The computer program product of claim 7, wherein the computer readable program further causes the computing device to:
responsive to the location failing to be the second logical partition, use a transport protocol to send the data from the originating application to the destination application.

9. The computer program product of claim 7, wherein the computer readable program further causes the computing device to:
receive the request to identify the location of the destination application;
identify the location of the destination application using a list of hardware addresses of network end-points connected to the logically partitioned data processing system; and
send the location of the destination application to an application programming interface.

10. The computer program product of claim 7, wherein using the bypass protocol provides at least one of a reduction of resource requirements, a preservation of transport protocol elements of discovering remote host application end-points, or a preservation of the socket information of an application programming interface, thereby eliminating any need to modify the plurality of applications, wherein the resource requirements are at least one of central processing unit (CPU) usage, memory usage, or input/output (I/O) bandwidth.

11. An apparatus, comprising:
a processor; and
a memory coupled to the processor, wherein the memory comprises instructions which, when executed by the processor, cause the processor to:
receive a request from an originating application to send data to a destination application, wherein the data is sent to a corresponding application buffer among a set of application buffers in the plurality of logical partitions associated with the destination application;
send a request to identify a location of the destination application to a virtualization management mechanism, wherein the virtualization management mechanism is external to the plurality of logical partitions and wherein the virtualization management mechanism is in communication with each of the plurality of logical partitions in the logically partitioned data processing system;
responsive to receiving a response from the virtualization management mechanism, determine whether the location of the destination application is in a second logical partition in a plurality of logical partitions of a logically partitioned data processing system;
responsive to the location being in the second logical partition, use a bypass protocol to send the data from the originating application to the destination application in the second logical partition; and
responsive to the destination application failing to be ready to receive the data, send the data to a system buffer associated with an operating system running the destination application.

12. The apparatus of claim 11, wherein the instructions further cause the processor to:
 responsive to the location failing to be the second logical partition, use a transport protocol to send the data from the originating application to the destination application.

13. The apparatus of claim 11, wherein the instructions further cause the processor to:
 receive the request to identify the location of the destination application;
 identify the location of the destination application using a list of hardware addresses of network end-points connected to the logically partitioned data processing system; and
 send the location of the destination application to an application programming interface.

14. The apparatus of claim 11, wherein using the bypass protocol provides at least one of a reduction of resource requirements, a preservation of transport protocol elements of discovering remote host application end-points, or a preservation of the socket information of an application programming interface, thereby eliminating any need to modify the plurality of applications, wherein the resource requirements are at least one of central processing unit (CPU) usage, memory usage, or input/output (I/O) bandwidth.

* * * * *